United States Patent
Hofmann et al.

(10) Patent No.: US 8,213,066 B2
(45) Date of Patent: Jul. 3, 2012

(54) ELECTROSTATIC COMB-DRIVE MICROMECHANICAL ACTUATOR

(75) Inventors: Ulrich Hofmann, Itzehoe (DE); Marten Oldsen, Hamburg (DE); Bernd Wagner, Looft (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 0 days.

(21) Appl. No.: 13/130,930

(22) PCT Filed: Nov. 17, 2009

(86) PCT No.: PCT/EP2009/008160
§ 371 (c)(1),
(2), (4) Date: Dec. 15, 2011

(87) PCT Pub. No.: WO2010/060552
PCT Pub. Date: Jun. 3, 2010

(65) Prior Publication Data
US 2012/0075685 A1       Mar. 29, 2012

(30) Foreign Application Priority Data
Nov. 28, 2008    (DE) .................. 10 2008 059 634

(51) Int. Cl.
*G02B 26/08* (2006.01)

(52) U.S. Cl. ............... 359/200.6; 359/199.2; 359/224.1; 310/309

(58) Field of Classification Search ............... 359/199.2, 359/200.6, 224.1–224.2, 290–291, 295; 310/309
See application file for complete search history.

(56) References Cited

U.S. PATENT DOCUMENTS

| | | | |
|---|---|---|---|
| 6,781,744 B1 | 8/2004 | Aksyuk et al. | |
| 7,715,076 B2 * | 5/2010 | Moidu | 359/199.2 |
| 2002/0026831 A1 | 3/2002 | Behin et al. | |
| 2004/0032634 A1 * | 2/2004 | Hah et al. | 359/224 |
| 2004/0100679 A1 * | 5/2004 | Kuo | 359/291 |
| 2008/0061026 A1 | 3/2008 | Milanovic et al. | |

FOREIGN PATENT DOCUMENTS

| | | |
|---|---|---|
| EP | 1806613 A1 | 7/2007 |
| EP | 2100848 A1 | 9/2009 |

OTHER PUBLICATIONS

German Office Action of German Patent Application No. 10 2008 059 634.5-56 Dated Nov. 28, 2008.

(Continued)

*Primary Examiner* — James Phan
(74) *Attorney, Agent, or Firm* — Venable LLP; Robert Kinberg

(57) ABSTRACT

The invention relates to a micromechanical actuator, especially a micro-mirror scanner, comprising an actuator unit in an outer frame which unit is suspended in the outer frame via two torsion elements, and electrostatic tilt drives from intermeshing first and second comb-type electrodes which are off-set from each other vertically. The first electrodes are rigidly connected to the outer frame and the second electrodes to the outer frame via an outer connecting element and to the actuator unit via an inner connecting element. The inner connecting element has a spring which extends in parallel to the outer tilting axis, which is connected to the same in a section of the actuator unit close the outer tilting axis, and which is designed and arranged to be rigid in the vertical direction and flexible at a right angle to the vertical direction. The micromechanical actuator according to the invention allows the use in a micro-mirror scanner whose slow axis is non-resonantly driven with excursions of >+/−7°, lateral mirror sizes having dimensions of 1 mm and more and a resonant frequency of >1 kHz and can be integrated even into flat mobile phones.

9 Claims, 3 Drawing Sheets

OTHER PUBLICATIONS

Young-Chul Ko et al., "Gimbaled 2D Scanning Mirror With Vertical Combs for Laser Display," IEEE Optical MEMS and Their Applications Conference, 2006, pp. 104-105.

V. Milanovic, "Improved Control of the Vertical Axis Scan for MEMS Projection Display," Optical MEMS and Nanophotonics, 2007, pp. 89-90.

International Search Report Application No. PCT/EP2009/008160 dated Nov. 14, 2011 (PCT/ISA/210).

International Search Report and Written Action from the International Search Office (PCT/ISA/237).

* cited by examiner

ELECTROSTATIC COMB-DRIVE MICROMECHANICAL ACTUATOR

CROSS REFERENCE TO RELATED APPLICATION

The present application is a U.S. National Stage of International Application No. PCT/EP2009/008160, filed Nov. 17, 2009, designating the United States and claiming priority to German application DE 10 2008 059 634.5, filed Nov. 28, 2008.

TECHNICAL FIELD OF APPLICATION

The invention relates to a micromechanical actuator, in particular a micro-mirror scanner, comprising an actuator unit in an outer frame, which unit is suspended in the outer frame via two torsion elements, extending along an outer tilting axis of the actuator unit, and an electrostatic tilt drive of intermeshing first and second comb-type electrodes, of which the first electrode is rigidly connected with the outer frame and the second electrode is in each case connected with the actuator unit.

BACKGROUND OF THE INVENTION

For purposes of driving micromechanical silicon actuators (MEMS actuators) electrostatic forces have been successfully deployed for several decades. Compared with drives operating on electromagnetic, piezo-electric and thermal principles, they have the advantage that the whole micro-actuator structure, including its drives, can be implemented completely in silicon. Examples of micromechanical actuators of this kind are resonantly operated micro-mirrors, acceleration sensors and rotation rate sensors. Since no other materials, which as a rule are mismatched with respect to their thermal expansion coefficients, are used, these micromechanical actuators can be encapsulated comparatively easily and with a high yield at wafer level using current wafer bonding technologies, such as anodic bonding, eutectic bonding or glass frit bonding, despite the associated high temperatures of sometimes significantly more than 300° C. (wafer level packaging). Suitable encapsulation is essential for MEMS products so as to offer protection against contamination by particles, liquids and gases, and also against mechanical over-stressing. As a result of the option of encapsulation of these systems not only at chip level but also even at wafer level low manufacturing costs are achieved at the same time as high production yields.

These advantages cannot be achieved with drives operating on the other principles. Thus electrodynamic drives, for example, require the deposition of thick metal layers so as to instantiate planar coils with the lowest possible ohmic resistance. In addition to the already significant disadvantage of the layer stresses, or layer stress gradients, which are very difficult to avoid with metal deposition and can result in severe distortion of the actuator, and the high metallic mass that the actuator must carry with it, an even greater problem arises relating to any attempt to encapsulate such an actuator using wafer bonding techniques at wafer level. In most cases the thermal mismatches of the materials involved rule out the use of a wafer level packaging method on account of the high temperatures. As a rule only non-hermetically sealed bonding techniques remain viable for purposes of protecting the microstructure. Further significant disadvantages of the electromagnetic drives ensue from the necessity of generating, in addition to moving planar coils, an external magnetic field by means of hybrid applied permanent magnets positioned as densely as possible on the micro-actuator. Such a hybrid-mounted system is more expensive and less suitable for mass production than an electrostatic actuator. The achievable minimum volume that can be achieved for an electromagnetically driven MEMS actuator is, as a rule, significantly greater than that which can be achieved for an actuator fitted with electrostatic drives.

The proposed micromechanical actuator is of particular importance for the field of optical micro-mirror actuators, but equally can also be deployed for many other types of actuator such as switches or gyroscopes. Micro-mirrors are deployed for the targeted deflection of an incident light beam or electromagnetic radiation in other wavelength ranges (IR, UV). As a rule, they take the form here of thin etched plates of silicon, which are mirror coated either dielectrically or with very thin metallic layers, and are suspended on torsion or bending strips such that they can move. When operated resonantly such micro-mirrors, up to several millimeters in size, can be deflected with sufficiently large scanning amplitudes at frequencies of many kilohertz. In recent years work has been very intensive on the development of dual-axis scanning micro-mirror systems that are designed to be deployed in compact laser projection displays. A single-colour or multi-colour laser beam is directed onto the moving mirror and is deflected by the latter in two axes, vertically and horizontally, so rapidly that the human eye perceives a continuously illuminated rectangular area on the projection surface. By synchronising the modulated laser source with the mirror movement image information can then be transferred with a high resolution.

For the deflection of the laser beam over the projection surface there are two fundamentally different scanning methods of known art, the raster scan and the Lissajous scan. In the case of the raster scanning method that is preferably deployed a rapid line movement is usually combined with a slow vertical movement. For example, in order to project a an image in SVGA resolution, that is to say 600 lines with 800 pixels per line, with a refresh rate of 60 Hz, a line frequency of at least 36 kHz is required. This applies for lines projected in one writing direction, thus e.g. from left to right. During the reset time period of the line, i.e. horizontal, scanner no information is therefore transferred. If one wishes, however, to utilise both scanning directions, in other words to project lines both from left to right and also from right to left, then the frequency requirement halves to at least 18 kHz. In order still to be able to achieve sufficiently large scanning amplitudes with what remains a very high scanning frequency, horizontal scanners are usually operated in resonance, which results in a sinusoidal velocity characteristic and thus an undesirable, non-homogeneous distribution of light intensity in the line direction. While this is almost impossible to circumvent in relation to the horizontal axis, it should at least be possible to achieve optimal homogeneity of the image presentation in the vertical direction. This is ideally achieved by means of non-resonant operation of the deflection in the vertical direction with a sawtooth-shaped scanning characteristic. In order to use the light available in an optimal manner an effort is made here to configure the rapid return to the starting point—i.e. the steeply falling sawtooth flank of the vertical scan—to be as short as possible. For compact laser projection displays with resolutions in VGA format, SVGA format or greater, optical constraints dictate that a mirror plate with a diameter in the millimeter range is required. The product of the mirror diameter and a single-sided mechanical scanning angle provides the so-called Theta-D product, which can be seen as a measure for the optical resolution. Thus for example for an SVGA resolution a Theta-D product [mm×degrees] of 9.37 is required in the horizontal direction, and 7.03 in the vertical direction. So as to achieve, on the one hand, sufficient shock robustness and lack of sensitivity to vibration for the microsystem when deployed in mobile applications, for example in a mobile phone, and to achieve, on the other hand, a sufficiently rapid reset of the mirror in sawtooth operation, preferably of less than 2 ms, the lowest natural resonance of the slow axis (vertical deflection) should not be less than 1000 Hz.

Let us assume, for example, a very compact, dual-axis, cardanically suspended micro-mirror scanner, whose mirror plate has an edge length of 1 mm. The frame surrounding this mirror and its torsion spring, also suspended such that it can move (in English usually denoted as a gimbal) inevitably has a significantly larger edge length than the mirror. Let us assume a comparatively short spring length for the torsion springs of 300 μm and an additional frame width of 200 μm. With a square contour the moving frame then has an edge length L of 2 mm. For the micro-actuator we assume further a minimum thickness D of 60 μm and a minimum natural torsional frequency of 1000 Hz. To achieve an SVGA resolution a mechanical tilting movement θ of at least +/−7° is required for the moving frame.

The natural torsional frequency $F_{res}$ can be expressed as:

$$F_{res} = \frac{1}{2\pi}\sqrt{\frac{k}{J}} \quad (1)$$

where k represents the spring constant, and J represents the moment of inertia of the mirror about the axis of rotation.

J can be expressed as:

$$J = \tfrac{1}{12}\rho D L^4 \quad (2)$$

Here ρ is the density of the mirror material (density of silicon: 2330 kg/m³).

The mechanical restoring torque $T_{mech}$ for the required full deflection, here assumed to be +/−7°, can be expressed as:

$$T_{mech} = k\theta \quad (3)$$

In addition for the maximum deflection it is true that:

$$|T_{aktuator}| = |T_{mech}| \quad (4)$$

If in equation (3) the spring constant k is replaced by the expression (1) and the given values for frequency, density, edge length and mirror thickness are inserted, then while taking into account equation (4) the torque that must be applied by the actuator $T_{aktuator}$ can be expressed as:

$$T_{aktuator} = \frac{4\pi^2 f_{res}^2 \rho D L^4 \theta}{12}$$

$$= \frac{4\pi^2 (1000 \text{ Hz})^2 \cdot 2330 \, \frac{\text{kg}}{\text{m}^3} \cdot 60 \cdot 10^{-6} \text{ m} \cdot (0{,}002 \text{ m})^4 \cdot \frac{7\pi}{180}}{12}$$

$$= 8{,}99 \cdot 10^{-7} \text{ Nm}$$

There are indeed micro-actuators with electromagnetic drives of known art that can generate torques of this order of magnitude. However, these have the disadvantages noted above. At this point in time micromechanical actuators of known art with non-resonant electrostatic drives are unable to achieve such torques with the required size of micro-mirror and high deflections.

For the tilting movement of an actuator unit electrostatic tilt drives that have intermeshing moving and static comb-type or finger-type electrodes are of known art. In order to generate quasi-static deflections of an appreciable amplitude with the aid of such electrostatic drives, also denoted as comb-drives, only comb-type electrodes that are offset from each other vertically have come into consideration to date. In most cases the vertical offset is generated by the use of a second silicon layer, which is electrically insulated from the plane of the first electrode that is located underneath. Static and moving electrodes are generated in different planes and thereby possess the desired vertical offset. By the application of a voltage between the static and moving electrodes the moving electrode is deflected out of the plane until the electrostatic torque and the mechanical restoring torque of the spring suspension of the mirror or frame balance one another. The maximum achievable static deflection angle is defined on the one hand by the vertical offset of the electrode planes as determined by the production process, and on the other hand by the electrode geometry, namely the lateral distance of the end of the moving comb-type electrode from the axis of rotation of the actuator unit. The greater this distance, the smaller is the maximum deflection angle that can be achieved. The greater the vertical offset of the electrode planes, the greater is this deflection angle.

In order to be able to achieve large tilt angles of more than +/−5° mechanically and also quasi-statically, i.e. in non-resonant operation, it is necessary to attach the electrodes near to the axis of rotation, i.e. the tilting axis, and not to create electrode fingers that are too long. Only in this manner is it possible to generate an effective torque over a larger range of angles. However, as a result of the short lever arm the torque that can be achieved is also very much lower than with a comparable arrangement of electrodes far from the axis with a large lever arm.

Thus Young-Chul Ko et al., "Gimbaled 2D Scanning Mirror with Vertical Combs for Laser Display", IEEE Optical MEMS and Their Applications Conference, 2006, Pages 104 and 105, shows, for example, such a dual-axis micro-mirror scanner for laser displays with vertically offset comb-type electrodes, via which the slow axis of this so-called gimbal arrangement is driven in a non-resonant manner. Here the moving comb-type electrodes are firmly connected with the actuator unit, and extend from the point of connection with the actuator unit parallel to the outer tilting axis, i.e. parallel to the slow axis. While the mirror diameter and resonant frequency in this micro-mirror scanner fulfil the above requirements, the mechanical quasi-static tilt angle obtained of +/−4.2° does not satisfy the specifications for high resolution projection.

This is only one example of many that show that up to the present time a standard design of a dual-axis micro-mirror scanner with electrodes positioned close to the axis is not suitable for achievement of the large scanning angles of more than +/−7° required for the slow quasi-static axis, if at the same time the mirror diameter is not to fall below a minimum of 1 mm, and the resonant frequency of the slow axis is not to be significantly less than 1 kHz. The high forces necessary would only be possible in conjunction with a much greater number of comb-type electrode fingers positioned near the axis. However, new problems would arise in these circumstances, since the moving mass thereby increases significantly, the sensitivity to accelerations increases and the space requirement is then not only very large along the fast mirror axis, but also at right angles to it. In particular when deploying such a dual-axis scanner in future generations of mobile phones, which are likely to be even flatter than existing models, at least one of the two chip edge lengths that lie parallel to the mirror surface must turn out to be sufficiently small to allow the mirror chip still to be integrated.

V. Milanović, "Improved Control of the Vertical Axis Scan for MEMS Projection Displays", Optical MEMS and Nanophotonics, 2007, Pages 89 and 90, features an arrangement of known art in which, despite the use of electrostatic comb-drives, comparatively large quasi-static tilt angles can be achieved with a sufficiently high resonant frequency and mirror size. A dual-axis mirror for laser projection is described, which, however, operates in a manner other than that of the above described micro-mirror scanner. To create the two axes the mirror does not possess a gimbal arrangement, by means of which the two axes can be deflected almost totally independently of one another. Instead a mirror plate, bonded to a small platform in a subsequent operation, is deflected with the aid of the platform, which can be tilted in two axes. In principle the axes are here more strongly coupled with one another than in a gimbal arrangement. This is undesirable for the applications that are presently being pursued, however, since accurate guidance via the tilting axes is not possible. The platform is tilted via comb-drives, which are located far from the mirror, i.e. from the platform. The torques are transferred to the platform via long rods orientated towards the centre of the chip and provided with a plurality of articulations. As a result of this construction both chip edge lengths are approximately the same size and are thus unsuitable for installation in flat items of equipment, in particular, flat mobile phones. According to measured data the proposed scanner achieves a mechanical vertical total deflection of approx. 11°, i.e. a symmetrical deflection of +/−5.5°, with a mirror plate diameter of 0.8 mm and an acceptable resonant frequency of 934 Hz. This likewise does not fulfil the above requirements for a high-resolution laser display.

On the basis of this prior art the object of the present invention consists in specifying a micromechanical actuator with a non-resonant electrostatic comb-drive that is suitable for deflecting a micro-mirror with an edge length of at least 1 mm at a natural frequency of $\geq 1$ kHz through at least +/−7°. In a dual-axis configuration the actuator should be also be suitable for the non-resonant drive of the slow axis, and should enable simple and cost-effective production in silicon technology, a hermetic vacuum encapsulation, and also a low power consumption.

SUMMARY

According to an embodiment of the invention, a micromechanical actuator has an actuator unit in an outer frame, which unit is suspended in the outer frame via two torsion elements extending along an outer tilting axis of the actuator unit, and electrostatic tilt drives formed from intermeshing first and second comb-type or finger-type electrodes, which are offset from each other vertically. The first electrodes are in each case rigidly connected with the outer frame, and the second electrodes are in each case connected with the outer frame via an outer connecting element, and with the actuator unit via an inner connecting element. In the proposed actuator the outer connecting element is designed such that it enables a bending in a vertical direction relative to the plane defined by the outer frame. The inner connecting element has a spring that extends in parallel to the outer tilting axis, in each case is connected in a region of the actuator unit with the latter that lies closer to the outer tilting axis than an edge of the actuator unit opposite to the outer tilting axis, and is designed and arranged such that it is rigid in the vertical direction and is flexible at a right angle to the vertical direction.

The spring may be designed such that it enables both lateral bending and also torsion, in order thereby to provide as little resistance as possible to the opposed circular arc movements of the actuator unit and electrostatic tilt drive, but generates high resistance to vertical deflection.

The spring may have a rectangular cross-section with a high aspect ratio, i.e. it may have the shape and properties of a leaf spring. For example, in cross-section this leaf spring could have a width of $\leq 5$ μm and a height of $\geq 30$ μm. However, other geometries and cross-sections of the spring are possible in order to achieve the above described properties.

The actuator unit can, for example, solely be formed from a micro-mirror so that a single-axis micro-mirror scanner is obtained. The actuator unit can also itself in turn comprise a frame in which an actuator element, for example, a micro-mirror is mounted such that it can rotate about a further tilting axis, as is implemented in a configuration of the proposed micromechanical actuator. By this means a dual-axis micro-mirror scanner is obtained that satisfies the above requirements on vertical deflection capability, resonant frequency, and also the non-resonant drive of the slow axis with lateral mirror dimensions of 1 mm or larger.

In particular this is achieved by means of the particular configuration of the electrostatic tilt drive, i.e. comb-drive, for the actuator unit with the connecting elements to the actuator unit and to the outer frame. Here the spring and its arrangement on the inner connecting element represents an important feature; by its action high torques can be transferred onto the actuator unit with a correspondingly high deflection. This requires a vertically rigid, but laterally an intrinsically bendable spring, which is connected near the outer tilting axis with the actuator unit. Here a total of four springs are deployed, two for each side of the actuator unit with respect to the tilting axis; these are then symmetrically located with respect to the actuator unit. Here the electrostatic tilt drives can also consist of a plurality of groups of comb-type or finger-type electrodes. The first and second electrodes are in each case offset from each other vertically so as to be able to achieve a stable deflection of the actuator unit in both directions.

The actuator unit or the actuator element are not limited to micro-mirrors. In fact it is also possible to create many other types of actuators, such as, for example, switches, sensors, or gyroscopes with this form of construction.

According to one embodiment, the proposed actuator may be designed as a dual-axis actuator, in particular as a dual-axis micro-mirror scanner. For this purpose the actuator unit has an actuator element in an inner frame, and also further electrostatic tilt drives formed from intermeshing third and fourth comb-type or finger-type electrodes. The actuator element is in turn suspended in the inner frame via torsion elements, which extend along an inner tilting axis at right angles to the outer tilting axis. The terms of inner and outer tilting axis serve here only to differentiate between the two tilting axes, wherein the inner tilting axis denotes the tilting axis of the element in the actuator that is located further inward. Here the inner frame corresponds to the moving frame of this gimbal arrangement. The third electrodes are rigidly connected with the inner frame and the fourth electrodes are rigidly or flexibly connected with the actuator element so as to be able to actuate a tilting movement of the actuator element via the tilt drive about the inner tilting axis. Here too the third and fourth electrodes are preferably arranged vertically offset from each other.

With implementation of the actuator element as a micro-mirror a dual-axis micro-mirror scanner can in this manner be achieved, which can attain the large scanning angle necessary for high resolution laser projection in non-resonant operation of the slow scanning axis, without the scanner itself at the same time becoming too fragile i.e. the slow axis can be implemented with a resonant frequency of around 1 kHz or higher. Here the slow axis corresponds to the tilting movement about the outer tilting axis. Horizontal deflections are enabled via the inner tilting axis in resonant operation with the necessary high frequency. With electrostatic drives on both axes a micro-mirror scanner of this kind can be produced wholly from silicon, and silicon dioxide for the insulation, apart from the mirror coating layer and connector panels. In turn this enables comparatively simple hermetically sealed wafer level packaging based on standard wafer bonding technology.

A micromechanical actuator of this kind, for example in the form of the dual-axis micro-mirror scanner as described, can also be implemented in a very compact form. In an embodiment of such a compact implementation the first and second comb-type or finger-type electrodes are designed on both sides of the outer tilting axis, wherein the electrode fingers are in each case aligned parallel to the outer tilting axis. This enables the arrangement of the comb-type or finger-type electrodes both for the outer tilt drive, and also for the inner tilt drive, on the same two opposing sides of the actuator, i.e. of the outer tilting axis, so that while the actuator increases in length it does not, however, increase in width. Via the increase in length the torque can be suitably increased by increasing the number of the comb-type or finger-type electrodes, without at the same time altering the width of the actuator. In this manner it is possible to integrate such an actuator into flat items of equipment, such as, for example, flat mobile phones.

The manufacturing techniques for such a micromechanical actuator are of known art to the person skilled in the art. To this end, as already noted in the introduction to the description, silicon technologies are as a rule deployed, wherein the vertically offset comb-type electrodes are generated by means of different layers in an appropriate layered structure. Needless to say, other technologies for the generation of the vertical offset are also possible. The connecting elements can, for example, be formed from silicon, as can also the springs; this ensures sufficient elasticity for the lateral bending and/or torsion of the springs. It is of particular importance that the springs promote little resistance to the desired functional and opposed circular path movements of the actuator unit and the electrostatic tilt drives, since otherwise a large proportion of the force gained by use of the many tilt drive electrodes would be immediately dissipated. In contrast, however, the springs should transfer the vertical component of the movement of the electrostatic tilt drives in as direct and loss-free a manner as possible.

BRIEF DESCRIPTION OF THE DRAWINGS

In what follows the proposed micromechanical actuator is once again elucidated in more detail with the aid of examples of embodiments in conjunction with the drawings. In the figures.

DETAILED DESCRIPTION

In what follows configurations for dual-axis micro-mirror scanners according to the present invention are elucidated; these have a mirror diameter of at least 1 mm and a slow axis resonant frequency of around 1 kHz or higher, and enable a mechanical deflection angle for the slow axis of around +/−7° or more. Here FIGS. 1 and 2 show configurations of such a micro-mirror scanner, in which at the same time, a small chip edge length is achieved in the dimension parallel to the mirror surface.

Figure 1:
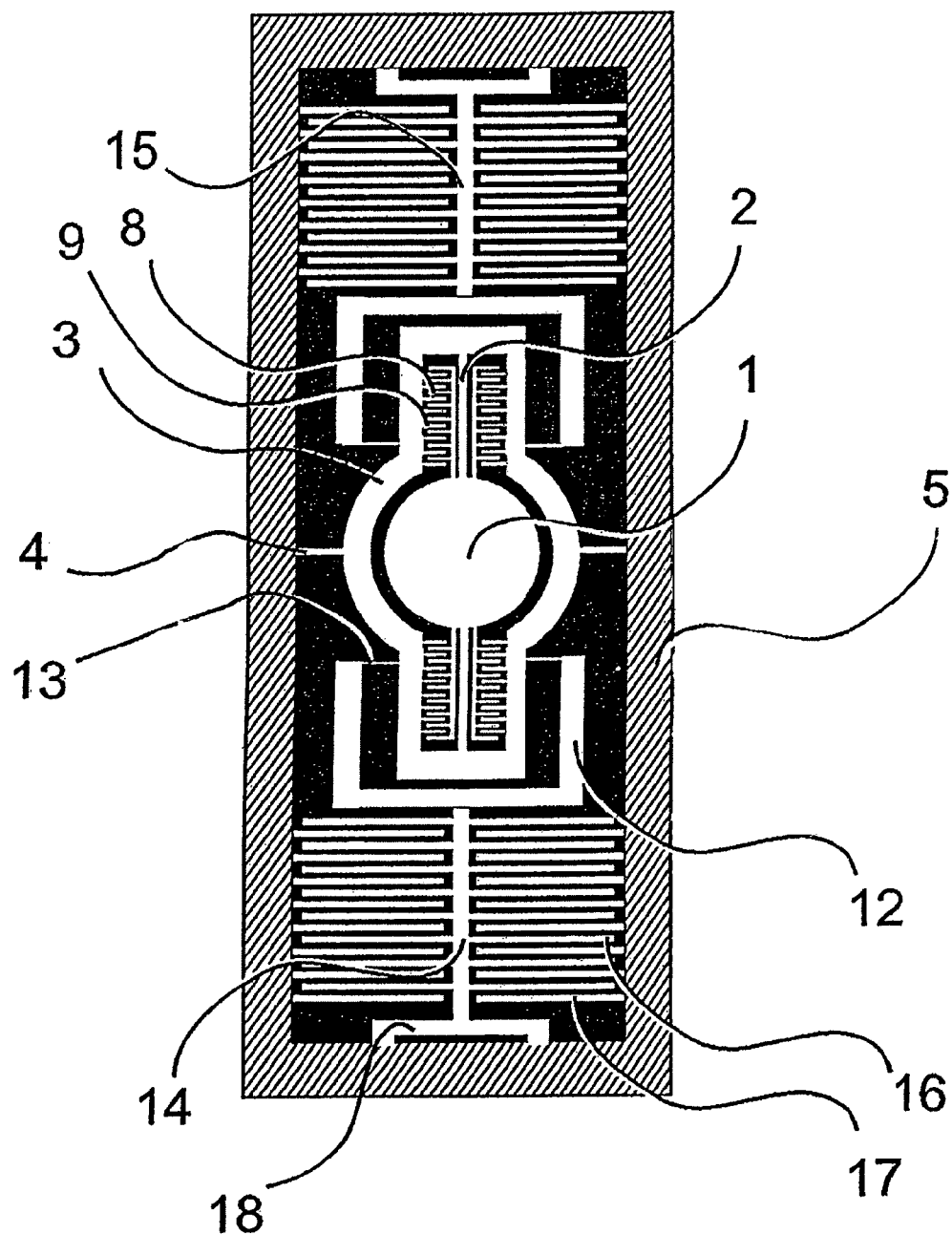
FIG. 1 shows a first example for a configuration of the micromechanical actuator as a dual-axis micro-mirror scanner.
Figure 2:
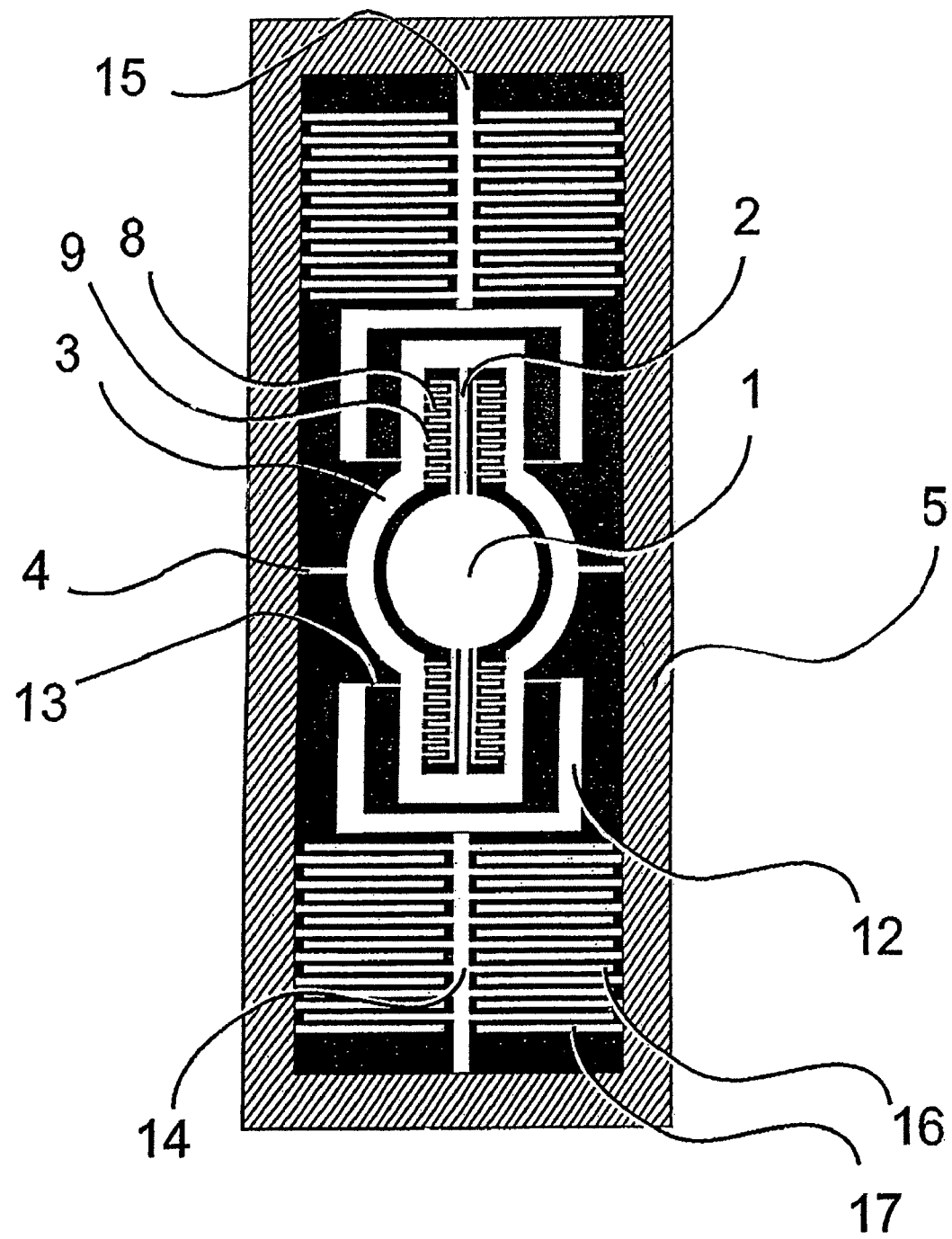
FIG. 2 shows a second example of a configuration of the micromechanical actuator as a dual-axis micro-mirror scanner.

The configuration of FIG. 1 shows a micro-mirror 1 that is suspended via torsion springs 2 about a tilting axis running along the torsion springs 2 (inner tilting axis) such that it can rotate in a moving frame (gimbal) 3 surrounding it. The micro-mirror 1 can be tilted about the inner tilting axis in the moving frame 3, by means of two electrostatic tilt drives that have vertically offset comb electrodes 8, 9. The moving frame 3 (inner frame) is in turn suspended via torsion springs 4 about a tilting axis prescribed by the characteristic of the torsion springs 4 (outer tilting axis) such that it can rotate in the rigid chip frame 5 (outer frame) surrounding it. The two tilting axes are at right angles to another. The moving inner frame 3 can be deflected by means of two electrostatic tilt drives 14, 15, in the vertical direction. The tilt drives 14, 15 feature a multiplicity of electrode fingers 16 that can move relative to the chip frame 5; the static vertically offset counter-electrode fingers 17 are attached to the chip frame 5. The moving electrode fingers 16 are connected with a U-shaped anchor structure 12, which in turn is connected with the inner frame 3. Via electrical activation of the electrode fingers 16 and counter-electrode fingers 17 a vertical lift or a vertical deflection can be generated at the end of the U-shaped anchor structure 12; this is essentially limited by the vertical offset of the static and moving electrode fingers 16, 17.

For reasons of manufacturability and production costs height differences no greater than 30 µm are available with most production processes for comb-drives of this type. In order nevertheless to be able to generate large deflections, in the arrangement here proposed the vertical movement generated by the comb-drives is transferred onto the inner frame 3 via leaf springs 13 that are vertically rigid, but intrinsically can be bent laterally. Here the leaf springs 13 have a length of 300 µm, a width of 4 µm, and a height of 30 µm, and are formed from silicon. For a given vertical maximum deflection of the comb-drives 14 and 15 respectively, the lateral separation distance of the suspension point of the leaf spring 13 on the inner frame 3 determines the maximum tilt angle of the inner frame 3 that can be achieved. The vertical lift translation achieved in this manner can be used for the purpose of generating mechanical tilt angles of +/−10° and more. For a tilt angle of +/−10° there ensues a maximum lateral separation distance of the connecting point of the leaf spring 13 with the inner frame 3 of approximately 170 µm to the outer tilting axis.

A prerequisite for ensuring that the maximum deflection of the drives 14 and 15 respectively is achieved is a sufficiently large number of vertically displaced comb-type electrode fingers. The arrangement proposed here has the particular advantage that the comb-type electrode arrangement does not extend significantly in the direction of the outer tilting axis, but rather at right angles to the latter. In the case of a dual-axis scanner this brings with it the advantage that the many drive electrodes required extend parallel to the similarly extended mirror torsion suspension formed from the torsion springs 2. As a result of the drives of the inner frame the chip is only therefore essentially larger in the direction in which it is already extended in particular by the existing inner axis of rotation. Since the chip edge length at right angles to the latter can remain particularly small, for example of the order of 2 mm, such a micro-mirror scanner or micro-mirror chip is particularly suitable for installation in extremely flat mobile phones.

Since the comb-drives 14, 15 are attached via their own suspensions to the rigid chip frame 5, for example by means of suitable torsion or bending suspensions 18, they also possess their own restoring moment. This restoring moment contributes to the fact that the actuator mass does not lower the resonant frequency of the moving inner frame 3 to a significant extent. From this there ensues a significant advantage compared with what would otherwise be a cantilevered attachment of the moving electrode fingers directly onto the moving inner frame 3, in which there is a significant lowering of the resonant frequency on account of the enormous rise in the moment of inertia as a result of the additional mass of the electrode fingers that is coupled in. In the proposed micromechanical actuator the resonant frequency of the moving frame 3 is predominantly determined by the gimbal structure and its torsion suspension 4, and only to a small extent by the masses of the drives 14, 15.

FIG. 2 shows a further configuration for the proposed micromechanical actuator as a dual-axis micro-mirror scanner. This configuration differs from the configuration of FIG. 1 in that here the electrostatic comb-drive 14, 15 is attached via its central supporting beam directly to the rigid chip frame 5, wherein a natural spring action is utilised in the event of vertical bending of this supporting beam. The outer connecting element is here thus formed from the supporting beam itself. Otherwise the configuration corresponds to that of FIG. 1.

FIG. 3 shows once again a similar structure to that of FIG. 2. However, here the electrostatic comb-drives 14, 15 are duplicated, so that even larger forces can be generated. The micro-mirror 1 is once again suspended via appropriate torsion springs 2 in an inner frame (gimbal) 3. Here the drives for the micro-mirror 1 in this inner frame 3 are not represented in the figure. The moving frame 3 is in turn suspended via torsion springs 4 in the rigid chip frame 5. The electrostatic comb-drives 14, 15 feature a multiplicity of finger electrodes 8, which are opposed to the vertically displaced static finger electrodes 9. The drives 14, 15 are duplicated in each case, are located at the side of the moving frame 3, and on one side lead out directly into the rigid chip frame 5. At the ends of the drives 14, 15 these are attached via leaf springs 13 to the moving frame 3 near the tilting axis of this moving frame 3. A dual-axis, electrostatically driven micro-mirror scanner constructed in this manner achieves in the same way as the configurations of FIGS. 1 and 2 an increase in amplitude via at least one non-resonantly operable axis and a step-up mechanism. However, this configuration cannot be implemented in such a space-saving manner as the configurations of FIGS. 1 and 2.

Figure 3:
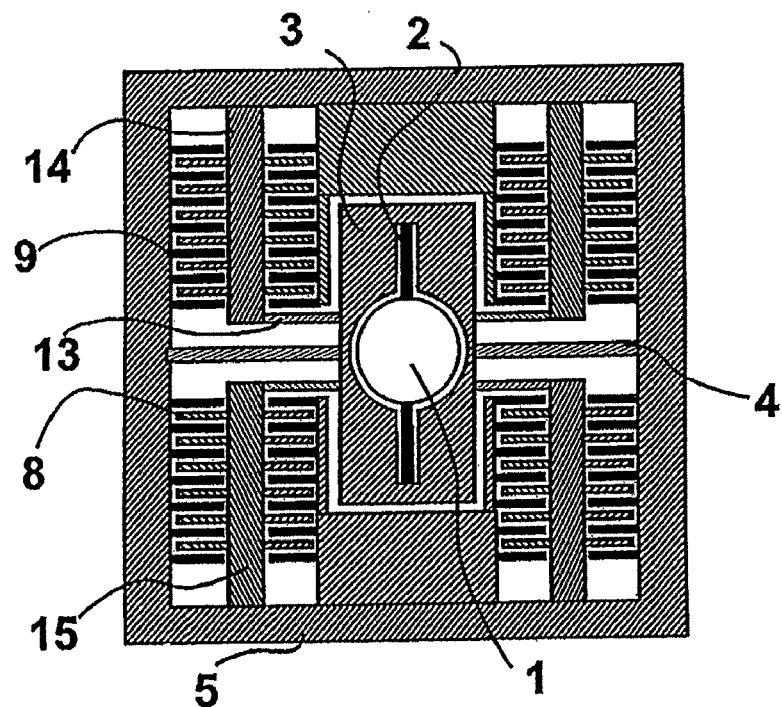
FIG. 3 shows a third example of a configuration of the micromechanical actuator as a dual-axis micro-mirror scanner.
Figure 4:
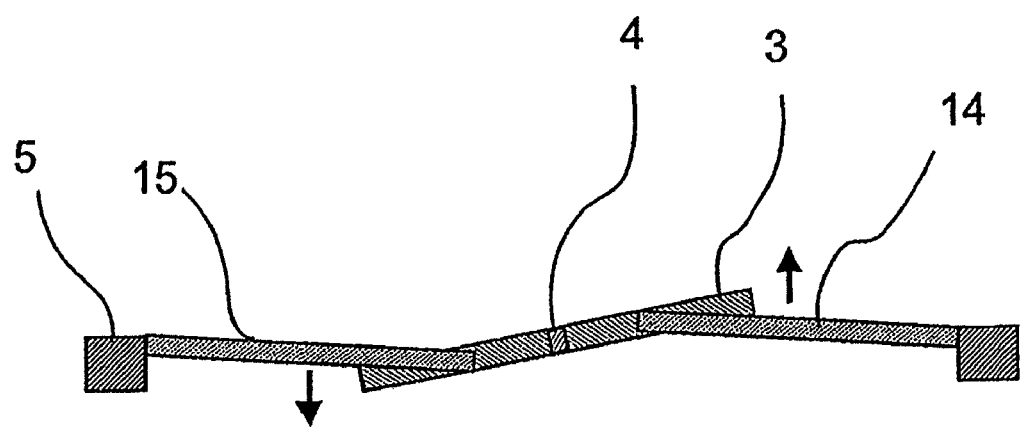
FIG. 4 shows a schematic representation of the tilting movement of the actuator unit of the micromechanical actuator in cross-section.

FIG. 4 shows finally, still in a schematic manner, the conditions during the deflection of the inner frame 3 by means of the electrostatic comb-drives, 14, 15, according to FIGS. 1 to 3. Here a side view of the moving inner frame 3, deflected to one side, is represented. This is attached via torsion springs 4 to the rigid chip frame 5. The drives 14, 15 drive the inner frame 3, and in each case are connected at the opposite end with the rigid chip frame 5. The leaf springs are not directly discernible in this configuration, since they extend into the plane of the sheet between the drives 14 and 15 and the moving frame 3. Here they behave in a rigid manner in the vertical direction but intrinsically can bend in the lateral direction.

The invention claimed is:

1. A micromechanical actuator, in particular a micro-mirror scanner, with
   an actuator unit in an outer frame, which is suspended via two torsion elements in the outer frame extending along an outer tilting axis of the actuator unit, and
   electrostatic tilt drives of intermeshing first and second comb-type or finger-type electrodes,
   which are vertically offset from each other, and of which the first electrodes are rigidly connected with the outer frame and the second electrodes are connected with the outer frame via an outer connecting element, and with the actuator unit via an inner connecting element, wherein the outer connecting element is designed such that it enables a bending in a vertical direction to a plane of the outer frame, and wherein
   the inner connecting element comprises two springs, which extend in parallel to the outer tilting axis, in each case are connected in a region of the actuator unit that lies closer to the outer tilting axis than an edge of the actuator unit opposite to the outer tilting axis, and which are designed and arranged such that they are rigid in the vertical direction and are flexible at a right angle to the vertical direction.

2. The micromechanical actuator according to claim 1, characterised in that,
   the springs are designed as leaf springs.

3. The micromechanical actuator according to claim 1, characterised in that
   the actuator unit has an actuator element in an inner frame, which is suspended in the inner frame via further torsion elements, which extend along an inner tilting axis at right angles to the outer tilting axis, wherein
   further electrostatic tilt drives formed from intermeshing third and fourth comb-type or finger-type electrodes are arranged between the inner frame and the actuator element,
   of which the third electrodes are rigidly connected with the inner frame, and the fourth electrodes are connected with the actuator element, so as to be able to actuate a tilting movement of the actuator element about the inner tilting axis.

4. The micromechanical actuator according to claim 3, characterised in that
   the actuator element is a micro-mirror with dimensions of at least 1 mm in a lateral dimension.

5. The micromechanical actuator according to claim 1 characterised in that
   the first and second comb-type or finger-type electrodes are designed on both sides of the outer tilting axis, wherein the electrode fingers of the comb-type or finger-type electrodes are aligned parallel to the outer tilting axis.

6. The micromechanical actuator according to claim 1 characterised in that
   the first and second comb-type or finger-type electrodes are designed and arranged on both sides of the outer tilting axis such that their number affects a length of the actuator at right angles to the outer tilting axis, but not, however, a width of the actuator parallel to the outer tilting axis.

7. The micromechanical actuator according to claim 1 characterised in that the inner connecting element has a U-shaped anchor structure that is connected via two springs with the actuator unit.

8. The micromechanical actuator according to claim 1 characterised in that
the outer connecting element in addition to a bending movement enables a torsion movement.

9. The micromechanical actuator according claim 1 characterised in that
the actuator unit is designed such that a resonant frequency of the tilting movement about the outer tilting axis is at least 1 kHz.

* * * * *